United States Patent
Sevier

(10) Patent No.: US 8,971,346 B2
(45) Date of Patent: Mar. 3, 2015

(54) SYSTEM AND METHOD FOR RELIABLE STORE-AND-FORWARD DATA HANDLING BY ENCODED INFORMATION READING TERMINALS

(75) Inventor: Mitchel P. Sevier, West Monroe, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 1977 days.

(21) Appl. No.: 11/799,320

(22) Filed: Apr. 30, 2007

(65) Prior Publication Data

US 2008/0267208 A1     Oct. 30, 2008

(51) Int. Cl.
*H04L 12/54* (2013.01)
*H04L 29/08* (2006.01)
*H04W 4/12* (2009.01)
*H04W 8/00* (2009.01)
*H04W 12/02* (2009.01)
*H04W 84/18* (2009.01)
*H04W 88/02* (2009.01)

(52) U.S. Cl.
CPC .............. *H04L 67/104* (2013.01); *H04W 4/12* (2013.01); *H04W 8/005* (2013.01); *H04W 12/02* (2013.01); *H04W 84/18* (2013.01); *H04W 88/02* (2013.01)
USPC ........... 370/429; 370/229; 370/394; 370/230; 370/428; 370/412; 370/413; 455/41.2

(58) Field of Classification Search
USPC ......... 370/338, 429, 428, 412, 413, 229, 394, 370/230
See application file for complete search history.

(56) References Cited

U.S. PATENT DOCUMENTS

| | | | |
|---|---|---|---|
| 5,943,322 | A | 8/1999 | Mayor et al. |
| 6,580,981 | B1 | 6/2003 | Masood et al. |
| 6,617,990 | B1 | 9/2003 | Lorenzo-Luaces et al. |
| 6,671,790 | B2 | 12/2003 | Gay Sam et al. |

(Continued)

FOREIGN PATENT DOCUMENTS

| | | |
|---|---|---|
| CN | 101036350 | 9/2007 |
| EP | 1760958 | 3/2007 |

(Continued)

OTHER PUBLICATIONS

Patent Cooperation Treaty International Search Report, dated Oct. 23, 2008, International Application No. PCT/US2008/061885, (4 pgs.).

(Continued)

*Primary Examiner* — Vladimir Magloire
*Assistant Examiner* — Shantell L Heiber
(74) *Attorney, Agent, or Firm* — Additon, Higgins & Pendleton, P.A.

(57) ABSTRACT

A data collection system for, and methods of, providing reliable store-and-forward data handling by encoded information reading terminals can utilize ad-hoc peer-to-peer (i.e., terminal-to-terminal) connections in order to store data that is normally stored on a single terminal only, in a redundant manner on two or more terminals. Each portable encoded information reading terminal can be configured so that when it captures data, a software application causes the terminal to search out nearby peer terminals that can store and/or forward the data to other peer terminals or to a data collection server, resulting in the data having been stored by one or more peer terminals that are immediately or not immediately accessible by the data-originating terminal.

26 Claims, 7 Drawing Sheets

(56) References Cited

U.S. PATENT DOCUMENTS

| | | | |
|---|---|---|---|
| 6,687,259 B2 | 2/2004 | Alapuranen | |
| 6,728,232 B2 | 4/2004 | Hasty, Jr. et al. | |
| 6,728,545 B1 | 4/2004 | Belcea | |
| 6,754,188 B1 | 6/2004 | Garahi et al. | |
| 6,771,666 B2 | 8/2004 | Barker, Jr. | |
| 6,807,165 B2 | 10/2004 | Belcea | |
| 6,873,839 B2 | 3/2005 | Stanforth | |
| 7,633,865 B2 * | 12/2009 | Andrews et al. | 370/230 |
| 2001/0021174 A1 * | 9/2001 | Luijten et al. | 370/229 |
| 2003/0071126 A1 | 4/2003 | Waxelbaum | |
| 2004/0218580 A1 | 11/2004 | Bahl et al. | |
| 2005/0063328 A1 | 3/2005 | Dunagan et al. | |
| 2006/0056370 A1 * | 3/2006 | Hancock et al. | 370/338 |
| 2006/0109084 A1 | 5/2006 | Yarvis | |
| 2007/0045424 A1 | 3/2007 | Wang | |
| 2008/0259927 A1 * | 10/2008 | Evans et al. | 370/394 |

FOREIGN PATENT DOCUMENTS

| | | | |
|---|---|---|---|
| JP | 2007129690 | | 5/2007 |
| WO | WO2006057863 | * | 6/2006 |
| WO | WO-2006057863 | | 6/2006 |

OTHER PUBLICATIONS

Patent Cooperation Treaty Written Opinion of the International Searching Authority, dated Oct. 23, 2008, International Application No. PCT/US2008/061885, (7 pgs.).

Antonio G. Ruzzelli et al., A Low-Latency Routing Protocol for Wireless Sensor Networks, Adaptive Information Cluster, Smart Media Institute in the Department of Computer Science at University College Dublin, Belfield, Dublin, 2003, 6 pgs.

Atul Adya et al., Architecture and Techniques for Diagnosing Faults in IEEE 802.11 Infrastructure Networks, MobiCom, Philadelphia, Pennsylvania, '04 Sep. 26-Oct. 1, 2004, 15 pgs.

C. Hedrick, Routing Information Protocol, Rutgers University, New Jersey, Jun. 1988, 29 pgs.

Christine E. Jones et al., A Survey of Energy Efficient Network Protocols for Wireless Networks, BBN Technologies, Cambridge, MA, School of EECS at Washington State University, Pullman, WA, and Telcordia Technologies, Morristown, NJ, 2001, 26 pgs.

Cisco Systems, Inc., Routing Information Protocol, Internetworking Technologies Handbook, Third Edition, Chapter 47, pp. 1-5., Dec. 1, 2001, Cisco Press, Indianapolis, IN.

D. Franco et al., A New Method to Make Communication Latency Uniform: Distributed Routing Balancing, Unitat d'Arquitectura d"Ordinadorsi Sistemes Operatius—Department d'Informàtica, Unviersitat Autònoma de Barcelona, Barcelona, Spain, 1999, 10 pgs.

Eric Setton et al., Congestion-Optimized Multi-Path Streaming of Video Over Ad Hoc Wireless Networks, Information Systems Laboratory in the Department of Electrical Engineering at Stanford University, Stanford, CA, 2004, 4 pgs.

Eric Setton et al., Minimizing Distortion for Multi-Path Video Streaming Over Ad Hoc Networks, Information Systems Laboratory in the Department of Electrical Engineering at Stanford University, Stanford, CA, 2004, 4 pgs.

Eun-Sun Jung et al., Power Aware Routing Using Power Control in Ad Hoc Networks, Department of Computer Science at Texas A&M University, College Station, TX, and the Department of Electrical and Computer Engineering and Coordinated Science Laboratory, Urbana, IL, Feb. 2005, 8 pgs.

G. Malkin, RIP Version 2, The Internet Society, URL: http://rfc.sunsite.dk/rfc/rfc2453.html, Aug. 2005, 41 pgs.

Gerald Fry et al., Adaptive Routing of QoS-Constrained Media Streams Over Scalable Overlay Topologies, Powerpoint Slides, Boston University, Boston, MA, 2003, 28 pgs.

Jiancong Chen et al., Mixed-Mode WLAN: The Integration of Ad Hoc Mode with Wireless LAN Infrastructure, Department of Computer Science, Electrical & Electronic Engineering at the Hong Kong University of Science and Technology, Clear Water Bay, Kowloon, Hong Kong, 2003, 5 pgs.

Jharna Chokhawala et al., Optimizing Power Aware Routing in Mobile Ad Hoc Networks, Real-Time Systems Laboratory Department of Computer Science at The University of Houston-University Park, Houston, TX, May 2004, 4 pgs.

Jongman Kim et al., A Low Latency Router Supporting Adaptivity for On-Chip Interconnects, Department of Computer Science and Engineering at Pennsylvania State University, University Park, PA, Jun. 2005, 6 pgs.

Lawrence G. Roberts, The Next Generation of IP—Flow Routing, SSGRR 2003S International Conference, L'Aquila Italy, Jul. 29, 2003, 11 pgs.

Longbi Lin et al., Power Aware Routing for Multi-hop Networks with Energy Replenishment, Purdue University, School of Electrical and Computer Engineering and the Department of Electrical and Computer Engineering and Coordinated Science Lab at the University of Illinois at Urbana-Champaign, Urbana, IL, 2004, 6 pgs.

Mike Woo et al., Power-Aware Routing in Mobile Ad Hoc Networks, Department of ECE at Oregon State University, Corvallis, OR, and Aerospace Corporation, El Segundo, CA, 1998, 15 pgs.

Paramvir Bahl et al., SSCH: Slotted Seeded Channel Hopping for Capacity Improvement in IEEE 802.11 Ad-Hoc Wireless Networks, MobiCom, Philadelphia, Pennsylvania. Sep. 26-Oct. 1, 2004, 15 Pgs.

Qun Li et al., Online Power-Aware Routing in Wireless Ad-hoc Networks, Department of Computer Science Dartmouth College, Hanover, NH, 2001, 11 pgs.

Ranveer Chandra, MultiNet: Connecting to Multiple IEEE 802.11 Networks Using a Single Radio, Cornell University, Ithaca, NY. Mar. 2004, 7 Pgs.

Ratul K. Guha et al, Fair Coalitions for Power-Aware Routing in Wireless Networks, Department of Engineering and Applied Science, Computer and Information Science, and Electrical Engineering at the University of Pennsylvania, Pennsylvania. Jul. 20, 2004, 21 pgs.

Sajith Balraj et al., Unicast Routing in Mobile Ad-Hoc Networks, Department of Computer Science and Engineering at the University of Buffalo, Buffalo, NY. Feb. 29, 2002, 11 pgs.

Sven Hanemann et al., Reducing Packet Transmission in Ad Hoc Routing Protocols by Adaptive Neighbor Discovery, Department of Mathematics and Computer Science at the University of Marburg, Marburg, Germany. 2003, 7 pgs.

Victor Bahl et al., SSCH: Improving the Capacity of IEEE 802.11 Multihop Networks Using Slotted Seeded Channel Hopping, Powerpoint Slide, Jun. 23, 2004, 1 pg.

Yuan Xue, Baochun Li, A Location-Aided Power-Aware Routing Protocol in Mobile Ad Hoc Networks, Department of Computer Science at the University of Illinois at Urbana-Champaign , Department of Electrical and Computer Engineering at the University of Toronto, Illinois and Toronto, Canada. 2001, 5 pgs.

European Patent Office, Communication Pursuant to Article 94(3) EPC, European Patent Application Number: 08769229.9, dated Feb. 11, 2011(7 pages).

* cited by examiner

SYSTEM AND METHOD FOR RELIABLE STORE-AND-FORWARD DATA HANDLING BY ENCODED INFORMATION READING TERMINALS

FIELD OF THE INVENTION

The present invention relates to data collection by hand held devices such as encoded information reading terminals. In particular, the present invention is directed to a data collection system for and methods of providing reliable store-and-forward data handling by encoded information reading terminals.

BACKGROUND OF THE INVENTION

Portable data collection terminals, such as, but not limited to, handheld bar code readers and radio frequency identification (RFID) readers might be used outside the range of established computer networks. Example environments that might not have reliable wireless connectivity to a computer network include, but are not limited to, construction sites, field excavation sights, airports, shipping docks, warehouses, parcel delivery and tracking services, and research locations. Additionally, sometimes certain areas of a building might not have reliable access to wireless service. Consequently, when large amounts of data are stored on a single data collection device that is used outside the range of established computer networks, there is the risk of losing data if a failure occurs on a particular device (e.g., due to device power failure or physical damage) before there has been the opportunity to upload its information to, for example, a database on a central server.

Therefore, there is a need for a data collection system for, and methods of providing reliable data handling in order to ensure stable data collection and storage in environments without reliable connectivity to servers that can be used to back-up data.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 3*a* illustrates a flow diagram of a sample implementation of the execution thread responsible for processing user interface commands and initialization of the parameters of the data management software program.

FIG. 3*b* illustrates a flow diagram of a sample implementation of the execution thread responsible for formatting the captured data into data packets and queuing the data packets for delivery to a data collection server.

FIG. 3*c* illustrates a flow diagram of a sample implementation of the execution thread responsible for formatting the inbound (received from peer terminals) data into data packets and queuing the data packets for delivery to a data collection server.

FIG. 3*d* illustrates a flow diagram of a sample implementation of the execution thread responsible for outbound data queue management, including data transmission to a data collection server and/or to peer terminals.

DETAILED DESCRIPTION OF THE INVENTION

In one embodiment, there is provided a data collection system for, and methods of, providing reliable store-and-forward data handling. In particular, the data collection system of the invention utilizes ad-hoc peer-to-peer (i.e., terminal-to-terminal) connections in order for data that originated in one encoded information reading terminal to be stored in a redundant manner across two or more terminals. Each encoded information reading terminal can be configured so that when it captures data, a software application causes the terminal to search out other nearby terminals that can store and/or forward the data to other terminals or to a data collection server, resulting in the data having been stored by one or more terminals that are immediately or not immediately accessible by the data originating terminal.

This store-and-forward mode of handling the captured data provides for more reliable delivery of the captured data to a data collection server in a situation when the data originating terminal has no direct connectivity to the data collection server by allowing every terminal to avail itself to the storage capacity of several peer terminals for the purposes of backing-up the captured data in a redundant way, and also by increasing the reliability of the data delivery to a data collection server by requiring every peer terminal to attempt the delivery of the captured data to other peer terminals via a wireless ad-hoc network, and/or to the data collection server via a wireless or wired network connection (e.g., when a terminal is returned to a home base and/or engaged to a docking station at the end of a work shift).

Thus, even if the data originating terminal loses at least a portion of the captured data (e.g., due to a battery power loss), one or more peer terminals will still hold copies of the portion of the data lost by the data originating terminal. Assuming that the probability of the successful delivery of a portion of data to a data collection server by all terminals is the same and less than 1 (e.g., due to the possibility of battery power being lost before the terminal is able to connect to a data collection server either wirelessly or via a docking station), then the probability of the successful delivery of a portion of data to the data collection server by n terminals would increase in accordance with the following formula:

$$P_s = 1 - (1-P_t)^n,$$

wherein $P_s$ is the probability of the successful delivery of a portion of the data to the data collection server by n terminals; $P_t$ is the probability of the successful delivery of a portion of the data to the data collection server by a single terminal; and n is the number of terminals. Thus, for example, if the probability of a successful delivery of a portion of data by a single terminal is 80%, the probability of a successful delivery of a portion of data by the data collection system comprising three terminals increases to the value of 99.2%.

Figure 1:
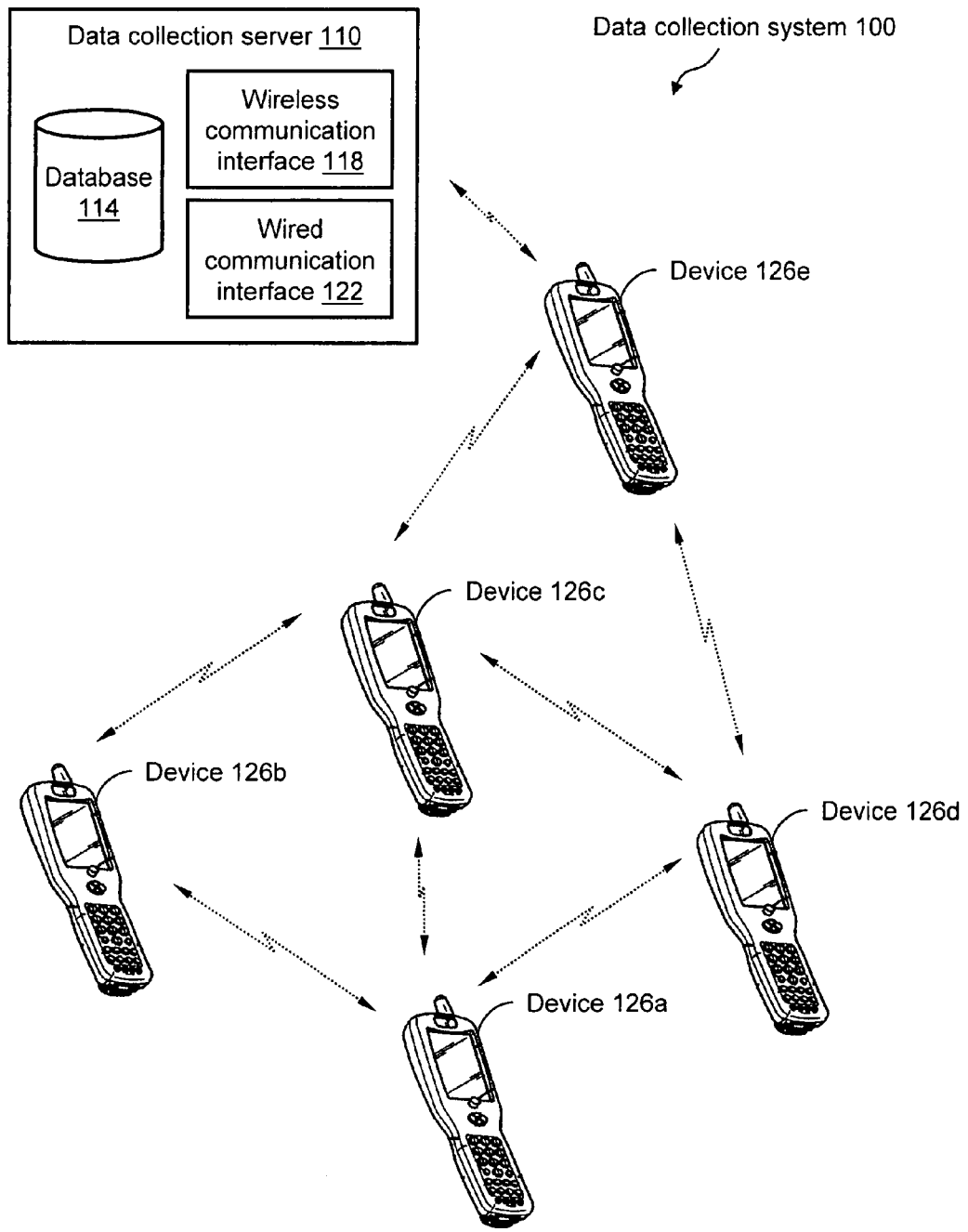
FIG. 1 illustrates a block diagram of an example of a data collection system that provides reliable store-and-forward data handling by use of peer-to-peer connections.

FIG. 1 illustrates a block diagram of an example of a data collection system 100 that provides reliable store-and-forward data handling by use of peer-to-peer connections. Data collection system 100 includes a data collection server 110, which can be any general purpose computing device that has data storage capability, such as a database 114, and networking capability via wired and/or wireless connections. In one example, data collection server 110 can include a wireless communication interface 118 that can include one or more radio transceiver devices, such as, but not limited to, one or more IEEE 802.11x radio transceivers, Bluetooth® radio transceivers, WIMAX radio transceivers, cellular radio transceivers, and any combinations thereof. Additionally, data collection server 110 can include a wired communication interface 122, such as, but not limited to, a serial input/output interface device that can include one or more RS232 ports, one or more Ethernet ports, one or more Universal Serial Bus (USB) ports, and any combinations thereof.

Data collection server 110 can run a data collection software application. In one example, data collection system 100 can include a server that runs a parcel delivery and tracking software application.

Data collection system 100 further includes a plurality of encoded information reading terminals 126, such as, but not limited to, encoded information reading terminals 126a, 126b, 126c, 126d, and 126e. Each encoded information reading terminal 126 can be a portable data collection device that is capable of outputting decoded message data corresponding to an encoded message. Each encoded information reading terminal 126 can include one or more encoded information reading devices; the devices can be one or more of a bar code reading device, an RFID reading device, and an IC card reading device. In one example, each encoded information reading terminal 126 can be a Dolphin® 9500 Mobile Computer by Hand Held Products, Inc. (Skaneateles Falls, N.Y.) incorporating an IT4XXX/5XXX bar code reading device imaging module. More details of an example encoded information reading terminal are described with reference to FIG. 2.

Figure 2:
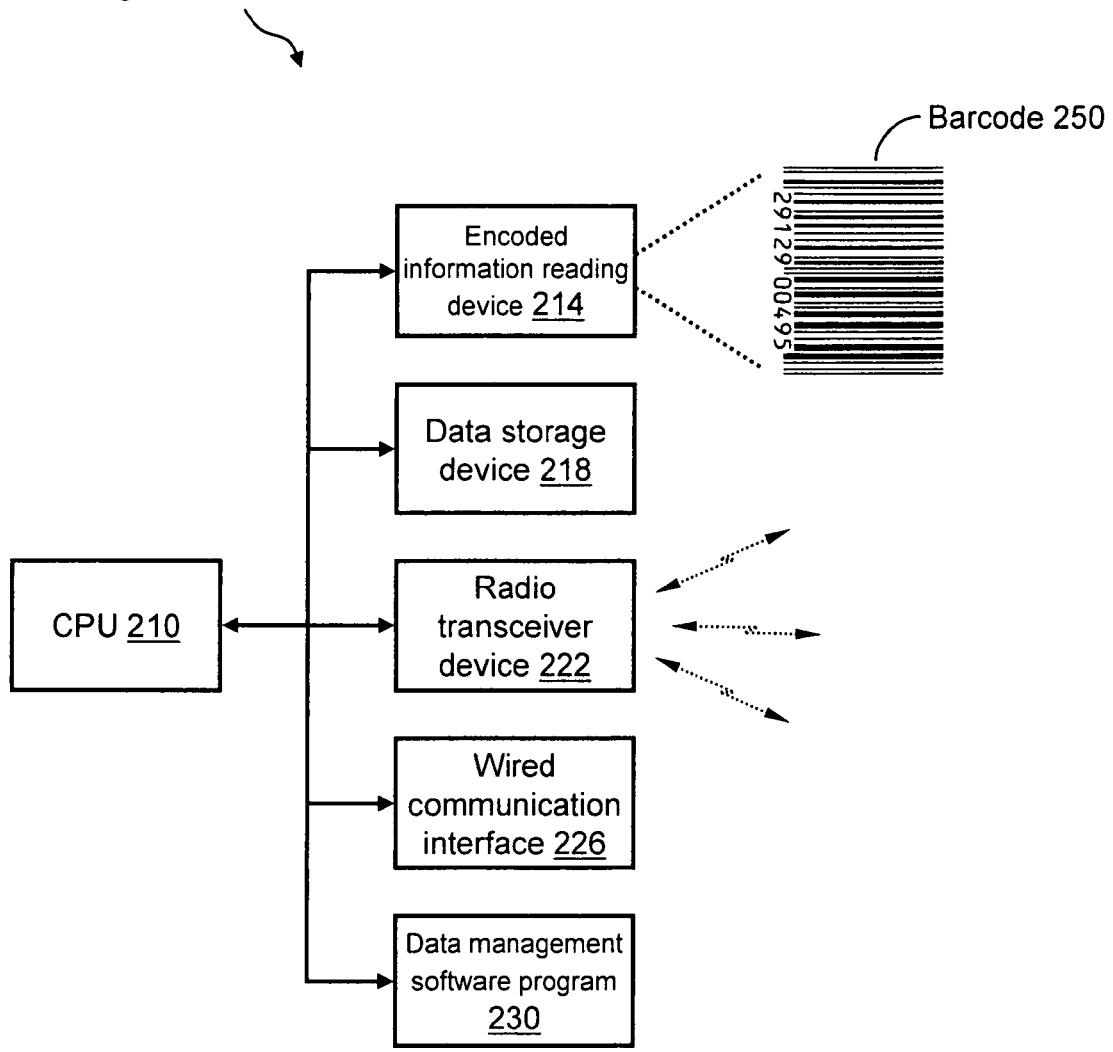
FIG. 2 illustrates a block diagram of an example of an encoded information reading terminal that is suitable for providing reliable store-and-forward data handling by use of peer-to-peer connections.

FIG. 2 illustrates a block diagram of encoded information reading terminal 126, which is an example of an encoded information reading terminal that is suitable for providing reliable store-and-forward data handling by use of peer-to-peer connections. In one example, encoded information reading terminal 126 can include a CPU 210 that is in communication with, for example, but not limited to, an encoded information reading device 214, a memory device 218, a radio transceiver device 222, a wired communications interface 226. Encoded information reading terminal 126 can execute a data management software program 230.

CPU 210 provides the overall control of all operations of encoded information reading terminal 126 and can be implemented as any suitable general purpose or specialized microcontroller, or microprocessor, together with the associated necessary circuitry, that is capable of executing program instructions such as those of the data management software program 230.

In one example, encoded information reading device 214 can be a bar code reading device, such as the IT4XXX/5XXX imaging module that has a decode out circuit of the type available from Hand Held Products, Inc. (Skaneateles Falls, N.Y.). The IT4XXX/5XXX imaging module with a decode out circuit provides decoding of a plurality of different types of bar code symbols and other decodable symbols such as PDF 417, Micro PDF 417, Maxicode, Data Matrix, QR Code, Aztec, Aztec Mesa, Code 49, UCC Composite, Snowflake, Data Gliffs, Code 39, Code 128, Codabar, UPC, EAN, Interleave 205, RSS, Code 93, Codablock, BC412, Postnet, Planet Code, BPO Forcedate, Canadian Forcedate, Japanese Post, KIX (Dutch Post), OCR A, OCR B, and any combinations thereof. In another example, reading device 214 can be an RFID reading device, such as the Skytek Sky Module M1 reading device and Sky Module M8 reading device. In the case of a bar code reading device, reading device 214 can scan the contents of, for example, a bar code 250, as shown in FIG. 2. In another example, reading device 214 can be a card reading device such as the Panasonic ZU-9A36CF4 integrated circuit smart card (IC CARD) reading device. In yet another example, reading device 214 can be any combinations of bar code reading device, RFID reading device, and card reading device.

Memory device 218 can be any volatile or nonvolatile memory device, such as, but not limited to, a volatile or nonvolatile random access memory (RAM). The storage capacity of memory device 218 can be selected according to the expected amount of data to be stored. For example, the storage capacity of data storage device 218 can be several kilobytes, megabytes, or gigabytes. Radio transceiver device 222 can be, for example, but not limited to, an IEEE 802.11x radio transceiver, a Bluetooth® radio transceiver, a WIMAX radio transceiver, a cellular radio transceiver, and any combination thereof. Wired communications interface 226 can be, for example, but not limited to, a serial input/output interface device, such as an RS232 port, an Ethernet port, a USB port, and any combination thereof.

Data management software program 230 controls the process forwarding the encoded message data to a data collection server and/or to at least one other encoded information reading terminal. In particular, the data management software program 230 can manage the ad-hoc peer-to-peer (i.e., terminal-to-terminal) connections in order to search out devices that are nearby the data-originating terminal and that can store and/or pass along the data to be shared. In one example, data management software program 230 can apply certain rule-based criteria to the data management operations. The data management software program 230 can perform the following functions:

1) User interface commands processing and parameters initialization, e.g., the target level of data redundancy in the data collection system, such as the maximum number of wireless network "hops" to be traversed by a data packet (in other words, the maximum number of terminal-to-terminal forward operations to be performed upon the data packet), and/or the maximum number of peer terminals that every terminal would transmit the data packet to.
2) Formatting the captured data into data packets and queuing the data packets for the delivery to a data collection server.
3) Outbound queue management, including the data transmission to a data collection server and/or to peer terminals.
4) Formatting the inbound (received from peer terminals) data into data packets and queuing the data packets for the delivery to a data collection server.

The data handled by the data management software program 230 can include any data originated by an encoded information reading terminal, such as the decoded messages outputted by the terminal, image data, video stream data, etc.

Referring again to FIGS. 1 and 2, the operation of a data collection system, such as data collection system 100 of FIG. 1, for providing reliable store-and-forward data handling can be summarized as follows. Two or more encoded information reading terminals 126 are deployed in an environment within which the wireless connectivity to data collection server 110 can not be reliable. Encoded information reading terminals 126 are capable of operating in the ad-hoc wireless connectivity mode and thus, two or more of encoded information reading terminals 126 can form an ad-hoc wireless network. For the purpose of illustration, a multitude of encoded information reading terminals 126 can be used by United States Postal Service (USPS) personnel deployed to a remote location, such as an airport, for capturing parcel bar code information of, for example, airline cargo. In this example, once scanned, the bar code decoded message data is stored locally by each respective encoded information reading terminal 126. Consequently, each respective encoded information reading terminal 126 contains unique data related to the respective operations of each USPS worker.

As each portion of encoded message data is outputted by the encoded information reading device of the data originating terminal 126a, the data is stored by the data storage device 218, and can also be formatted into one or more data packets and appended to the outbound data queue for delivery to the data collection server 110. The data management software program 230 is constantly attempting to purge the outbound data queue by forwarding the data packets from the outbound data queue to a data collection server and/or to one or more peer encoded information reading terminals. The data management software program 230 can determine whether there is wired or wireless connectivity to data collection server 110. If the connectivity to the server 110 is detected, then the terminal 126a can transmit one or more data packets from the outbound data queue to the server, and can purge the packets from the outbound data queue upon receiving an acknowledgement from the server 110; otherwise, the terminal 126a can transmit a request signal via its radio transceiver device 222 in order to determine whether other encoded information reading terminals 126 are present within its broadcast range for the purpose of forming an ad-hoc wireless network therewith. In one embodiment, zero or more encoded information reading terminals 126 are equipped with at least two radio transceiver devices 222, wherein at least one radio transceiver device 222 is configured to operate in the infrastructure mode, and at least one radio transceiver device 222 is configured to operate in the ad-hoc mode; and zero or more encoded information reading terminals 126 are equipped with only one radio transceiver device 222. The radio transceiver devices 222 of the single-transceiver devices can be configured to operate in the infrastructure mode when uploading data to a server or receiving data from a server, and to switch to ad hoc mode at all other times, so that a single transceiver device would be available to participate in an ad-hoc wireless network whenever the device is not engaged in the infrastructure mode data transfers.

By way of example and referring again to FIG. 1, encoded information reading terminal 126a broadcasts a terminal status request message and one or more other encoded information reading terminals 126, such as encoded information reading terminals 126b, 126c, and 126d, transmit a response message which can include the replying terminal's battery life expectancy, remaining data storage capacity, and the connectivity to a data collection server. The connectivity of a terminal to a data collection server can be measured, e.g., as the number of network hops between a terminal and the data collection server, with a large positive number (e.g., 1024) indicating no connectivity. Subsequently, the data management software program 230 executed by the data-originating encoded information reading terminal 126a can apply certain rule-based criteria in order to select zero or more peer terminals to transmit at least of portion of the captured data to, e.g., by analyzing: the peer terminals' status information (e.g., the battery life expectancy, the remaining data storage capacity, and/or the connectivity to a data collection server); the status of preexisting data (e.g., whether the data packet to be transmitted already exists on the peer terminal); and the data type (e.g., when certain data types only are to be stored and forwarded, such as, but not limited to, bar code data, RFID data, image data, signature data, video data; and any combination thereof).

The data originating terminal 126a can also limit the number of peer terminals to transmit a data packet to, by applying the target level of redundancy rules, such as the maximum number of wireless network "hops" to be traversed by a data packet, and/or the maximum number of peer terminals that every terminal would transmit the data packet to.

In this example, every peer terminal 126b, 126c, and/or 126d, upon receiving at least a portion of the data captured by the data originating terminal 126a, appends the data to its outbound data queue. The outbound data queue is managed as described herein supra, i.e. by attempting to forward the data packets from the outbound data queue to a data collection server and/or to one or more per encoded information reading terminals. Thus, the execution of the reliable store-and-forward data handling software program is not limited to encoded information reading terminals 126b, 126c, and/or 126d that are immediately accessible to the data originating terminal 126a. For example, the data originated by the terminal 126a can be passed to the terminal 126d and then to the terminal 126e.

In this example, upon return to the USPS home base within which there is a reliable connectivity to the data collection server 110, all the data originated by encoded information reading terminals 126 can be transmitted to, for example, database 114 via wireless communication interface 118 or wired communication interface 122 of data collection server 110. More details of the operation of a data collection system, such as data collection system 100 of FIG. 1, are described with reference to the methods of FIGS. 3a-3d and 4.

FIGS. 3a-3d illustrate flow diagrams of sample implementations of algorithms employed by the data management software program 230 of FIG. 2 for providing reliable store-and-forward data handling by use of peer-to-peer connections in a data collection system, such as data collection system 100 of FIG. 1. FIGS. 1 and 2 are referenced throughout the description of the algorithms of FIGS. 3a-3d.

The main functions of the data management software program 230 can be implemented as independently and simultaneously executable processing threads, where each of the threads starts execution upon the terminal power-up and initialization, and is constantly scheduled for execution until the terminal powers down. However, a skilled artisan would appreciate the fact that other suitable implementations are possible, e.g., employing multiple processes rather than multiple threads in an operating system which does not support threads; or employing a single process architecture with or without using hardware and/or software interrupt servicing routines in an operating system which only processes single process architecture, etc.

Each of FIGS. 3a-3d illustrates a flow diagram of an algorithm implementing one of the threads.

Figure 3A:
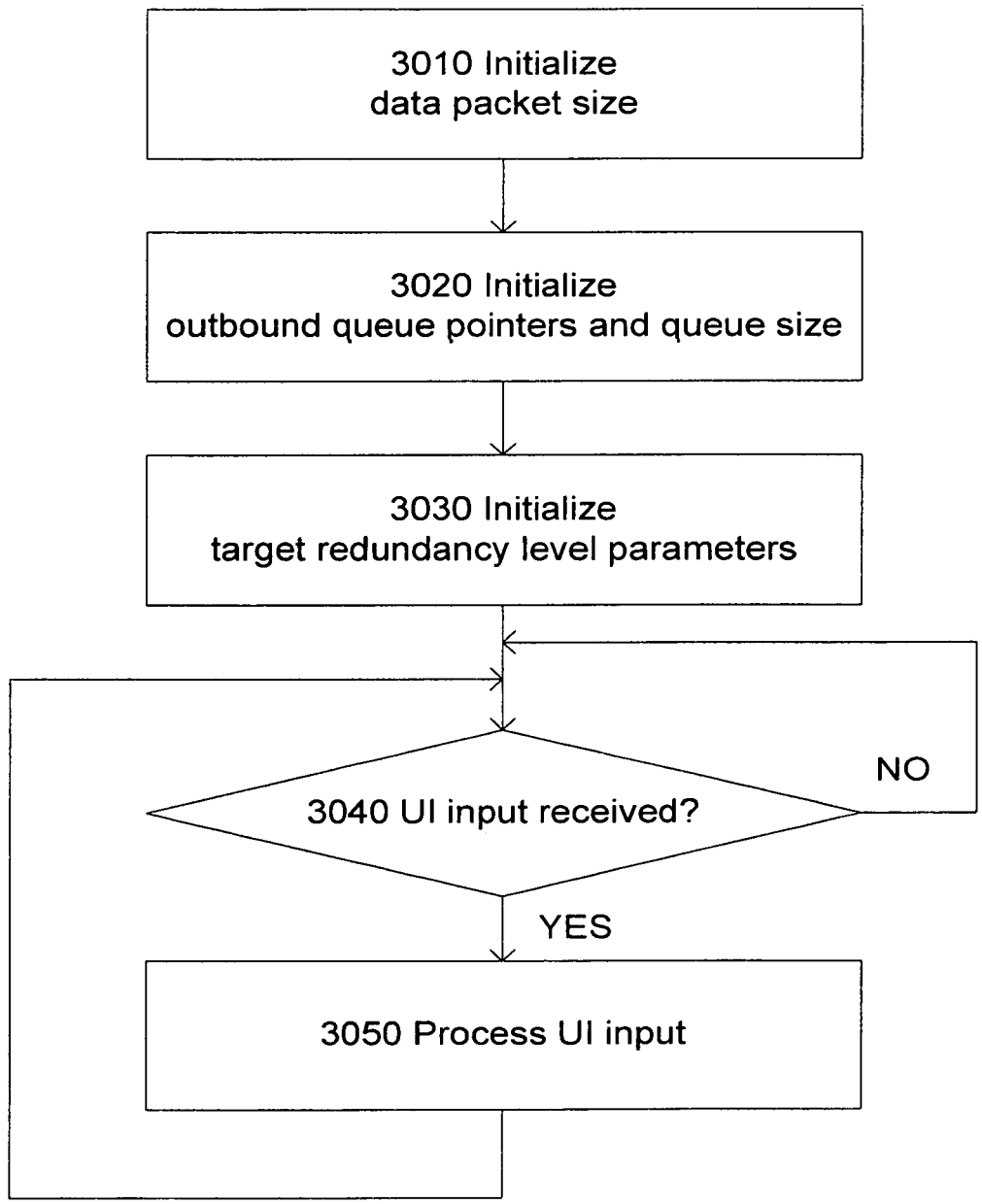
FIGS. 3*a*-3*d* illustrate flow diagrams of sample implementations of algorithms employed by the data management software program executed by an encoded information reading terminal for providing reliable store-and-forward data handling by use of peer-to-peer connections in a data collection system, such as the data collection system of FIG. 1.

FIG. 3a illustrates a flow diagram of a sample implementation of the execution thread responsible for processing user interface commands and initialization of the parameters of the software program 230.

At step 3010, the data packet size is initialized, e.g., with pre-determined default values, which later can be changed, e.g., via a user interface.

At step 3020, the outbound queue pointers are initialized to point to the start of the queue. The Read queue pointer holds the index of the element of the outbound queue which should be read next, and the Write pointer holds the position of the first unused word within the memory reserved for the outbound queue. The outbound queue size is also initialized, e.g., with a pre-determined default value, which later can be changed, e.g., via a user interface.

At step 3030, the parameters of the target level of redundancy in storing and forwarding the data within the data collection system, such as the maximum number of wireless network "hops" to be traversed by a data packet, and/or the maximum number of peer terminals that every terminal would transmit the data packet to are initialized, e.g., with a pre-determined default value, which later can be changed, e.g., via a user interface. Upon receiving a data packet, a terminal would decrement the number of wireless network "hops" by 1, and only forward the packet to other peer terminals if the new value of wireless network "hops" is more than zero.

At step 3040, the method ascertains whether any user interface input has been received. If yes, the processing continues at step 3050; otherwise, the method loops back and waits for the user input at step 3040.

At step 3050, the method processes the user input received, e.g., the new initialization values for the data packet size, outbound queue size, and/or the parameters of the target level of redundancy in storing and forwarding the data within the data collection system. Then, the method loops back to step 3040.

Figure 3B:
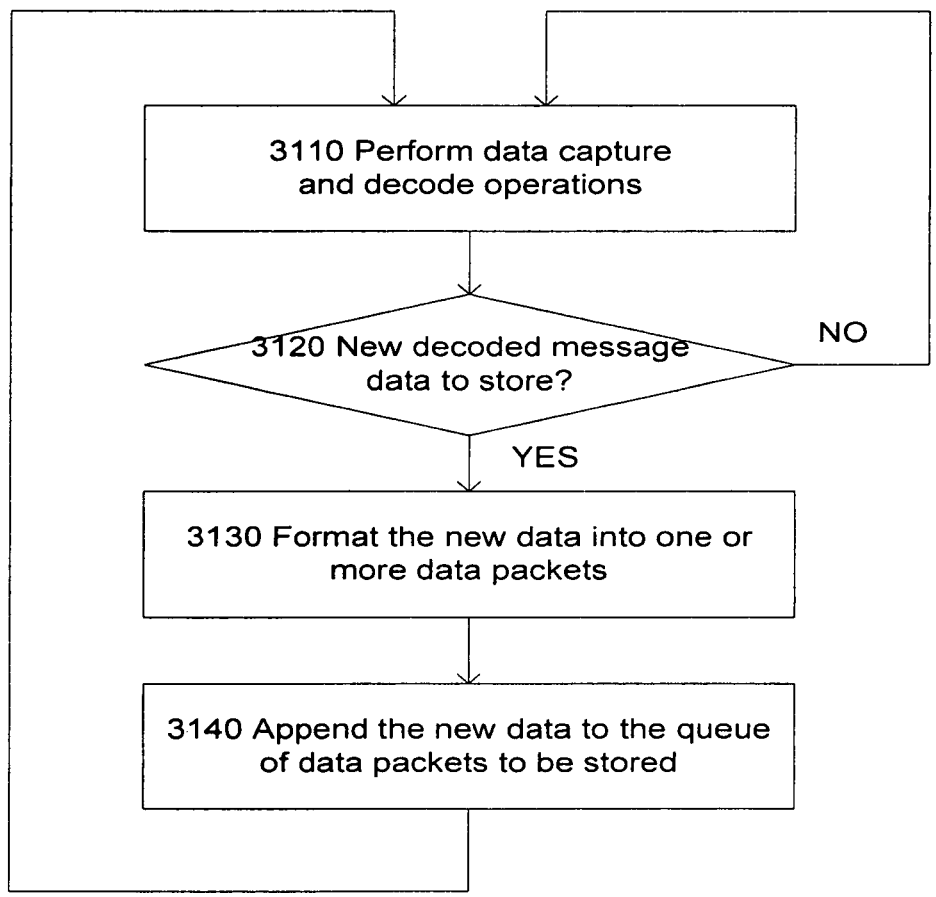

FIG. 3b illustrates a flow diagram of a sample implementation of the execution thread responsible for formatting the captured data into data packets and queuing the data packets for the delivery to a data collection server.

At step 3110, the method performs the data capture and decoding operations.

At step 3120, the method ascertains whether any new encoded message data needs to be stored. If yes, the processing continues at step 3130; otherwise the method loops back to step 3110.

At step 3130, the method formats the new decoded message data into one or more data packets, e.g., by appending the packet payload (i.e., the encoded message data itself) to the packet header. The packet header can contain the originating terminal ID, the packet ID, the packet size as the number of wireless network "hops" to be traversed by the packet, and the maximum number of peer terminals that every terminal would transmit the packet to. Terminal ID and packet ID can be useful for facilitating the re-assembling of the decoded message data by the data collection server 110. Terminal ID and packet ID can also be useful for a terminal to determine, upon receiving a wireless message from a peer terminal, whether one or more data packets received has already been stored by the terminal.

At step 3140, the method appends to the outbound queue the one or more data packets created at the previous step, and then loops back to step 3110.

Figure 3C:
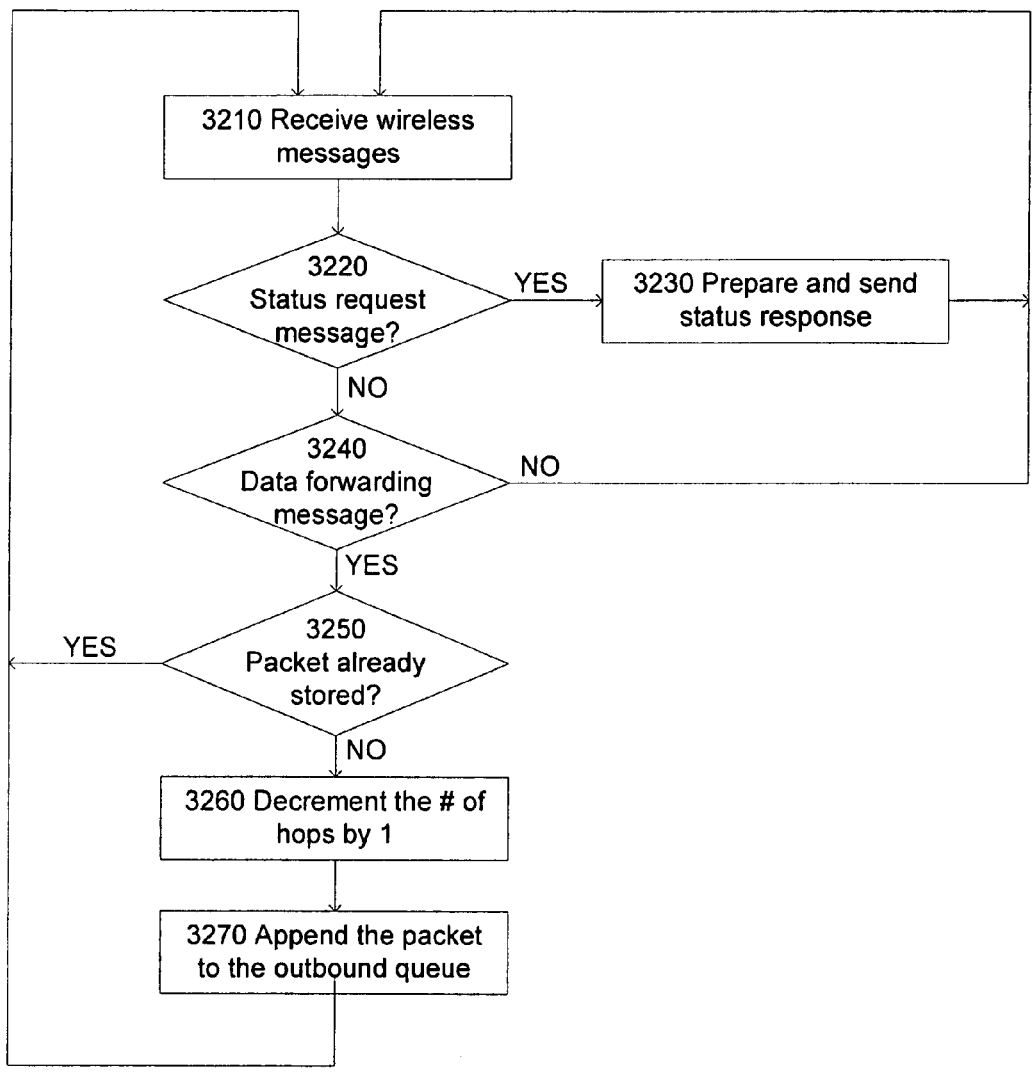

FIG. 3c illustrates a flow diagram of a sample implementation of the execution thread responsible for formatting the inbound (received from peer terminals) data into data packets and queuing the data packets for delivery to a data collection server.

At step 3210, the method reads the next incoming wireless message received from one of the peer encoded information reading terminals.

At step 3220, the method ascertains whether the message received is a status request message. If yes, the method branches to step 3230; otherwise, the processing continues at step 3240.

At step 3230, the method prepares and transmits a status response message which can include the replying terminal's battery life expectancy, remaining data storage capacity, and the connectivity to a data collection server. Then, the method loops back to step 3210.

At step 3240, the method ascertains whether the message received is a data forwarding message. If yes, the processing continues at step 3250; otherwise, the method loops back to step 3210.

At step 3250, the method ascertains whether the data packet has already been stored by the terminal where the method is being executed, e.g., by comparing the terminal ID and the packet ID extracted from the packet header with the terminal ID and packet ID values of the data packet already stored by the terminal where the method is being executed. If yes, the method loops back to step 3210; otherwise, the processing continues at step 3260.

At step 3260, the method extracts from the packet header the number of wireless network "hops" to be traversed by a data packet, and decrements it by 1.

At step 3270, the method appends the data packet to the outbound data queue for forwarding to the data collection server 110 of FIG. 1 and/or to one or more peer encoded information reading terminals 126 of FIG. 1. Then, the method loops back to step 3210.

Figure 3D:
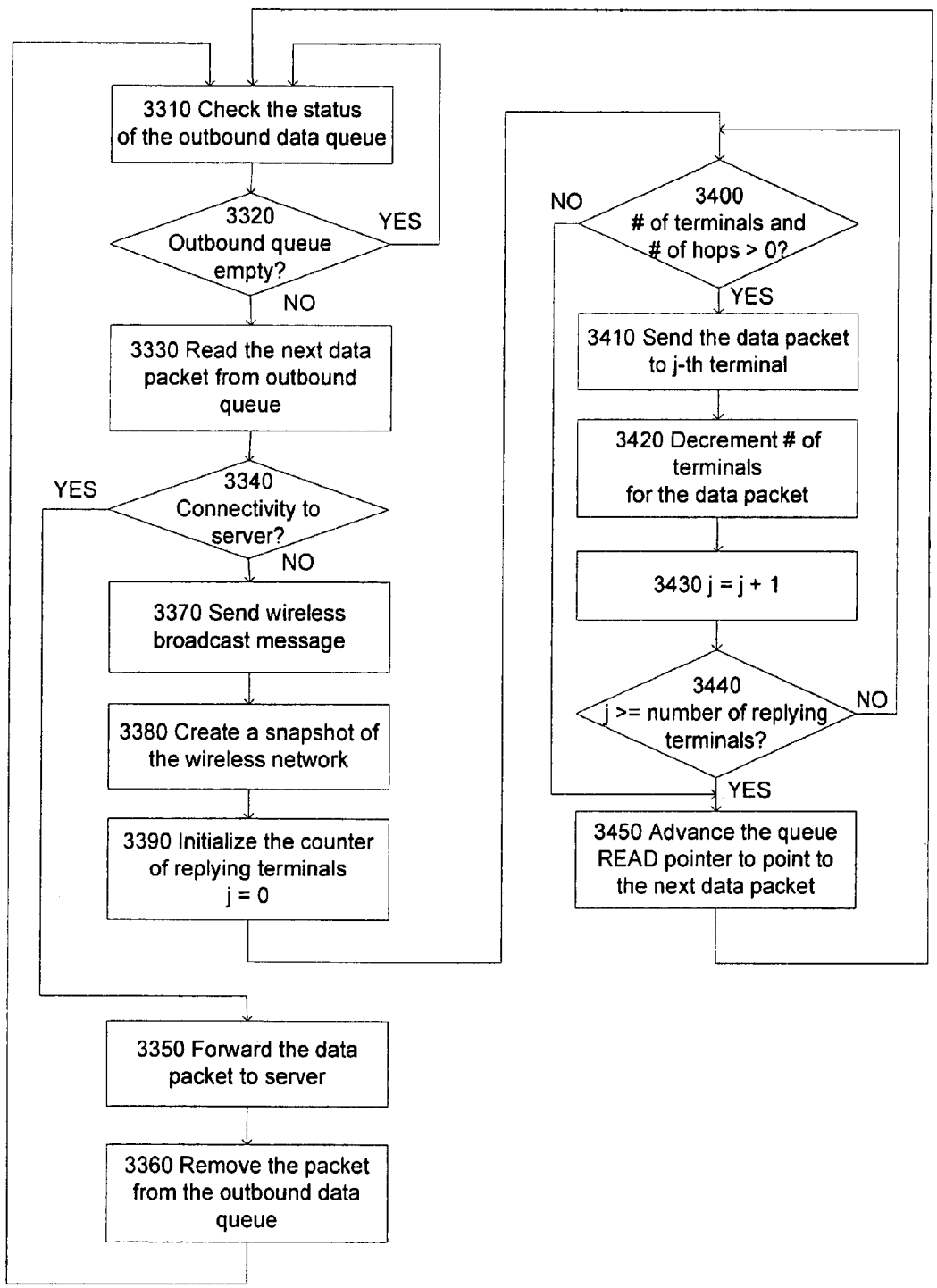

FIG. 3d illustrates a flow diagram of a sample implementation of the execution thread responsible for the outbound data queue management, including the data transmission to a data collection server and/or to peer terminals.

At step 3310, the method checks the status of the outbound data queue, e.g., by inspecting the values of the queue pointers.

At step 3320, the method ascertains whether the outbound queue is empty. If yes, the method loops back to step 3310; otherwise, the processing continues at step 3330.

At step 3330, the method reads the next data packet from the outbound queue.

At step 3340, the method ascertains whether the terminal has direct connectivity to the data collection server 110 of FIG. 1. If yes, the processing continues at step 3350; otherwise the method branches to step 3370.

At step 3350, the method forwards the data packet to the data collection server 110.

At step 3360, the data packet is removed from the outbound queue. In one embodiment, the data packet is only removed from the outbound queue upon receiving an acknowledgement from the data collection server 110 confirming that the data packet has been received by the server and successfully stored in the server's memory. Upon removing the data packet from the outbound queue, the method loops back to step 3310.

At step 3370, the encoded information reading terminal executing the method sends a wireless broadcast message to all encoded information reading terminals 126 within the wireless communication range. Encoded information reading terminal 126 receiving a broadcast request message can process it and reply in accordance with the algorithm of FIG. 3c.

At step 3380, based on the responses received from peer encoded information reading terminals, a snapshot of the wireless network is created by storing the terminal ID numbers and status information of one or more responding terminals 126. In one example, terminal 126a stores the terminal ID numbers and status information of one or more directly responding terminals 126 and develops a network snapshot of directly connected terminals only. In another example, terminal 126a would choose one or more peer terminals to transmit the data to based upon the information contained in the terminal status response message received from the peer terminals, e.g., terminal 126a would only transmit the data to the terminals directly connected to the data collection server, and/or would only transmit the data to the terminals having an amount of memory available for data storage exceeding a first threshold value, and/or would only transmit the data to the terminals having the battery life expectancy exceeding a second threshold value. In yet another example, the network snapshot is sorted by the replying terminal connectivity to the data collection server 110, and/or by the amount of memory available at the replying terminal to store the data packets received from other terminals, and/or by the battery life expectancy of the replying terminal, hence, the terminal 126a would first transmit the data to the terminals directly connected to the data collection server, and then to other terminals; and also would first transmit the data to the terminals with more memory available for data storage, and with longer battery life expectancy. In yet another example, each replying encoded information reading terminal 126 can also forward to terminal 126a the response messages which the replying terminal 126 received from other terminals that can be in or out of the range of encoded information reading terminal 126a. In doing so, data management software program 230 of encoded information reading terminal 126a can develop a snapshot of the entire network of terminals that includes all terminals, both in or out of the wireless broadcast range of terminal 126a.

At step 3390, the counter J of peer terminals storing a copy of the data packet being processed, gets initialized with the value of 0.

At step 3400, the method ascertains whether both the number of terminals the data packet should be sent to and the number of wireless network "hops" to be traversed by the packet are more than zero. If yes, the processing continues at step 3410; otherwise, the method branches to step 3450.

At step 3410, the data packet gets sent to j-th replying terminal. In one embodiment, the receiving terminal would send an acknowledgement back to the sending terminal upon successfully receiving and storing the data packet.

At step 3420, the counter of terminals the data packet should be sent to gets decremented by 1.

At step 3430, the counter J of peer terminals storing a copy of the data packet gets incremented by 1, and then at step 3440 the method ascertains whether the value of J has reached the number of the peer terminals having replied to the broadcast message. If yes, the processing continues at step 3450; otherwise the method loops back to step 3400.

At step 3450, the Read pointer of the outbound data queue is advanced to point to the next data packet and the method loops back to step 3310.

Methods of FIGS. 3a-3d of providing reliable store-and-forward data handling by use of peer-to-peer connections are exemplary only. Other variations and limiting and/or non-limiting criteria of the reliable store-and-forward data handling operations are within the scope and spirit of the invention. In one embodiment, the peer terminals can communicate to each other using mesh inter-connectivity which can be implemented, e.g., based on Dynamic Source Routing (DSR) protocol, which is a routing protocol designed specifically for use in multi-hop wireless ad hoc networks of mobile devices.

Figure 4:
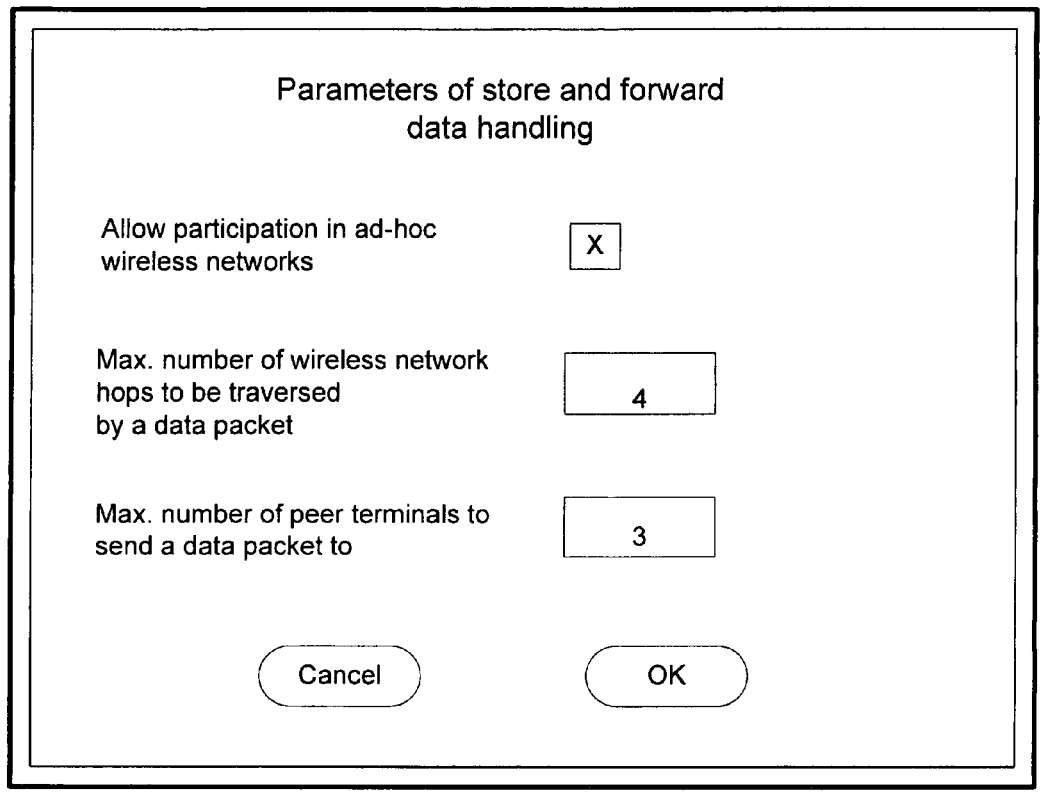
FIG. 4 illustrates a sample user interface allowing an operator of an encoded information reading terminal to specify the parameters of store-and-forward data handling mode.

FIG. 4 illustrates a sample user interface allowing an operator of an encoded information reading terminal to specify the parameters of store-and-forward data handling mode, by specifying a level of data redundancy which is determined by the maximum number of wireless network "hops" to be traversed by a data packet containing decoded message data originated by said terminal, and by further specifying the maximum number of peer terminals that said terminal would transmit a data packet to.

In summary, a data collection system of the present invention, such as data collection system 100 of FIG. 1, provides a mechanism for accomplishing reliable store-and-forward data handling. In particular, data collection system 100 utilizes ad-hoc peer-to-peer (i.e., encoded information reading terminal 126a to encoded information reading terminal 126b) connections in order to store data that is normally stored on a single encoded information reading terminal 126 only in a redundant manner in parallel across two or more terminals. As each encoded information reading terminal 126 captures data, a software program such as data management software program 230 of FIG. 2 causes the terminal to search out other nearby terminals that can store or pass along the data to be shared. In passing the data along, the data can be stored in one or more encoded information reading terminals 126 that are immediately or not immediately accessible by the originating encoded information reading terminal 126.

A small sample of systems methods and apparatus that are described herein is as follows:

A1. An encoded information reading terminal operating in a data collection system including an external data collection server and a plurality of peer terminals, the encoded information reading terminal comprising: an encoded information reading device outputting decoded message data corresponding to an encoded message, the encoded information reading device selected from the group consisting of a bar code reading device, an RFID reading device, and IC card reading device; a hand held housing incorporating said encoded information reading device; at least one wireless communication interface; a memory device; a battery; wherein said encoded information reading terminal is configured, upon power up, to initialize in said memory a data structure for storing an outbound data queue for queuing data packets intended for the delivery to said data collection server; wherein said encoded information reading terminal is further configured, in response to a user interface action, to perform a data capture operation yielding captured data, followed by formatting said captured data into one or more data packets, each of said data packets comprising a header and a payload, and further followed by appending said one or more data packets to said outbound data queue; wherein said encoded information reading terminal is further configured, in response to receiving a wireless message from one or more of said peer terminals, said message containing one or more data packets of said captured data, to append said one or more data packets to said outbound data queue; and wherein said encoded information reading terminal is further configured to periodically ascertain the presence of data packets in said outbound data queue and upon detecting the presence of one or more data packets in said outbound data queue to perform a method of forwarding the data packets from said outbound data queue to at least one of said data collection server, one or more said peer encoded information reading terminals. There has also been described (A2) The encoded information reading terminal of claim A1 wherein said captured data includes at least one of decoded message data outputted by said encoded information reading device, image data, and video stream data. There has been described (A3) The encoded information reading terminal of claim A1 wherein said method of forwarding the packets from said outbound data queue comprises the steps of: (i)

reading a data packet from said outbound data queue; (ii) conditionally, upon ascertaining that said encoded information reading terminal has direct connectivity to said data collection server, sending said data packet to said data collection server and removing said data packet from said outbound data queue; (iii) conditionally, upon ascertaining that said encoded information reading terminal does not have direct connectivity to said data collection server, sending a wireless broadcast message to said peer terminals, followed by sending said data packet to one or more of said peer terminals which has sent a response message to said broadcast message and which satisfy a criteria for receiving data packets. There has also been described (A4) The encoded information reading terminal of claim A3 wherein the operator of said terminal is able to select a level of data redundancy in storing and forwarding said captured data within said data collection system. There has also been described (A5) The encoded information reading terminal of claim A3 wherein the operator of said terminal is able to select a level of data redundancy in storing and forwarding said captured data within said data collection system; wherein said level of data redundancy is controlled by a first threshold number; and wherein each said data packet from said outbound data queue is forwarded by each terminal of said plurality of encoded information reading terminals to a number of said peer terminals not exceeding said first threshold number. There has also been described (A6) The encoded information reading terminal of claim A3 wherein the operator of said terminal is able to select a level of data redundancy in storing and forwarding said captured data within said data collection system; wherein said level of data redundancy is controlled by a second threshold number said second threshold number representing number of wireless network "hops" to be traversed by said data packet; wherein said encoded information reading terminal upon receiving said data packet from one of said peer terminals, decrements by one said number of wireless network "hops" to be traversed by said data packet; and wherein said encoded information reading terminal only forwards said data packet to one or more of said peer terminals conditionally, upon satisfying the condition that the value of the number wireless network "hops" after executing said decrementing is more than zero. There has also been described (A7) The encoded information reading terminal of claim A3 wherein said response message includes at least one of the battery life expectancy, the amount of memory available for storing said data packets, and the connectivity to said data collection server of the replying terminal. There has also been described (A8) The encoded information reading terminal of claim A3 wherein said criteria for receiving data packets is based on the information contained in said response message. There has also been described (A9) The encoded information reading terminal of claim A3 wherein said criteria for receiving data packets includes at least one of the connectivity of the terminal originating said response message to said data collection server; the amount of memory available for storing said data packets at the terminal originating said response message, exceeding a first threshold value; the battery life expectancy of the terminal originating said response message, exceeding a second threshold value. There has also been described (A10) The encoded information reading terminal of claim A3 wherein said criteria for receiving data packets includes creating a wireless network snapshot comprising said responses received from said plurality of encoded information reading terminals; followed by sorting said wireless network snapshot in the order of the connectivity of the terminal originating said response message to said data collection server, amount of memory available for storing said data packets at the terminal originating said response message, and the battery life expectancy of the terminal originating said response message; and followed by transmitting said one or more data packets to said one or more peer terminals in the order of said sorted responses.

B1. A data collection system comprising: a plurality of encoded information reading terminals, each having at least an encoded information reading device outputting decoded message data corresponding to an encoded message, the encoded information reading device selected from the group consisting of a bar code reading device, an RFID reading device, and IC card reading device, a hand held housing incorporating said encoded information reading device, at least one wireless communication interface, a memory device, and a battery; and a data collection server external to said encoded information reading terminal having at least one network interface capable of establishing communications with said plurality of bar code reading terminals, and being in communication with at least a database storing the decoded messages data collected by said terminals; wherein said data collection system is configured to support ad-hoc network connectivity between said encoded information reading terminals in order to increase the reliability of the delivery of said encoded message data to said data collection server; wherein each terminal of said plurality of encoded information reading terminals is configured, upon power up, to initialize in said memory a data structure for storing an outbound data queue for queuing data packets intended for delivery to said data collection server; wherein each terminal of said plurality of encoded information reading terminals is further configured, in response to a user interface action, to perform a data capture and decoding operation yielding captured data, followed by formatting said captured data into one or more data packets, each of said data packets comprising a header and a payload, and further followed by appending said one or more data packets to said outbound data queue; wherein each terminal of said plurality of encoded information reading terminals is further configured, in response to receiving a wireless message from one or more of said plurality of encoded information reading terminals, said message containing one or more data packets of said captured data, to append said one or more data packets to said outbound data queue; and wherein each terminal of said plurality of encoded information reading terminals is further configured to periodically ascertain the presence of data packets in said outbound data queue and upon detecting the presence of one or more data packets in said outbound data queue to perform a method of forwarding the data packets from said outbound data queue to at least one of said data collection server, one or more said peer encoded information reading terminals. There has also been described (B2) The data collection system of claim B1 wherein said captured data includes at least one of decoded message data outputted by said encoded information reading device; image data; and video stream data. There has also been described (B3) The data collection system of claim B1 wherein said method of forwarding the packets from said outbound data queue by each terminal of said plurality of encoded information reading terminals comprises the steps of: (i) reading a data packet from said outbound data queue; (ii) conditionally, upon ascertaining that said encoded information reading terminal has direct connectivity to said data collection server, sending said data packet to said data collection server and removing said data packet from said outbound data queue; (iii) conditionally, upon ascertaining that said encoded information reading terminal does not have direct connectivity to said data collection server, sending a wireless broadcast message to said peer terminals, followed by sending said data packet to one or more of said peer terminals which has sent a response message to said broadcast message and which satisfy a criteria for receiving data packets. There has also been described (B4) The data collection system of claim B3 wherein the operator of each terminal of said plurality of encoded information reading terminals is able to select a level of data redundancy in storing and forwarding said captured data within said data collection system. There has also been described (B5) The data collection system of claim B3 wherein the operator of each terminal of said plurality of encoded information reading terminals is able to select a level of data redundancy in storing and forwarding said captured data within said data collection system; wherein said level of data redundancy is controlled by a first threshold number; and wherein each said data packet from said outbound data queue is forwarded by each terminal of said plurality of encoded information reading terminals to a number of said peer terminals not exceeding said first threshold number. There has also been described (B6) The data collection system of claim B3 wherein the operator of each terminal of said plurality of encoded information reading terminals is able to select a level of data redundancy in storing and forwarding said captured data within said data collection system; wherein said level of data redundancy is controlled by a second threshold number said second threshold number representing number of wireless network "hops" to be traversed by said data packet; wherein said encoded information reading terminal upon receiving said data packet from one of said peer terminals, decrements by one said number of wireless network "hops" to be traversed by said data packet; and wherein said encoded information reading terminal forwards said data packet to one or more of said peer terminals conditionally, upon satisfying the condition that the value of the number wireless network "hops" after executing said decrementing is more than zero. There has also been described (B7) The data collection system of claim B3 wherein said response message includes at least one of the battery life expectancy, the amount of memory available for storing said data packets, and the connectivity to said data collection server of the replying terminal. There has also been described (B8) The data collection system of claim B3 wherein said criteria for receiving data packets is based on the information contained in said response message. There has also been described (B9) The data collection system of claim B3 wherein said criteria for receiving data packets includes at least one of the connectivity of the terminal originating said response message to said data collection server; the amount of memory available for storing said data packets at the terminal originating said response message, exceeding a first threshold value; the battery life expectancy of the terminal originating said response message, exceeding a second threshold value. There has also been described (B10) The data collection system of claim B3 wherein said criteria for receiving data packets includes creating a wireless network snapshot comprising said responses received from said plurality of encoded information reading terminals; followed by sorting said wireless network snapshot in the order of the connectivity of the terminal originating said response message to said data collection server, amount of memory available for storing said data packets at the terminal originating said response message, and the battery life expectancy of the terminal originating said response message; and followed by transmitting said one or more data packets to said one or more peer terminals in the order of said sorted responses.

C1. A method of reliable store-and-forward data handling by an encoded information reading terminal operating in a system including an external data collection server and a plurality of peer terminals, comprising the steps of: upon power up, initializing in said memory a data structure for storing an outbound data queue for queuing data packets intended for the delivery to said data collection server; in response to a user interface action, performing a data capture operation yielding captured data, followed by formatting said captured data into one or more data packets, each of said data packets comprising a header and a payload, and further followed by appending said one or more data packets to said outbound data queue; in response to receiving a wireless message from one or more of said peer terminals, said message containing one or more data packets of said captured data, appending said one or more data packets to said outbound data queue; and periodically ascertaining the presence of data packets in said outbound data queue and upon detecting the presence of one or more data packets in said outbound data queue, forwarding the data packets from said outbound data queue to at least one of said data collection server, one or more said peer encoded information reading terminals. There has also been described (C2) The method of reliable store-and-forward data handling of claim C1 wherein said captured data includes at least one of decoded message data corresponding to an encoded message, said decoded message data outputted by said encoded information reading device; image data; and video stream data. There has also been described (C3) The method of reliable store-and-forward data handling of claim C1 wherein said forwarding the packets from said outbound data queue further comprises the steps of: (i) reading a data packet from said outbound data queue; (ii) conditionally, upon ascertaining that said encoded information reading terminal has direct connectivity to said data collection server, sending said data packet to said data collection server and removing said data packet from said outbound data queue; (iii) conditionally, upon ascertaining that said encoded information reading terminal does not have direct connectivity to said data collection server, sending a wireless broadcast message to said peer terminals, followed by sending said data packet to one or more of said peer terminals which has sent a response message to said broadcast message and which satisfy a criteria for receiving data packets. There has also been described (C4) The method of reliable store-and-forward data handling of claim C3 wherein the operator of said terminal is able to select a level of data redundancy in storing and forwarding said captured data within said data collection system. There has also been described (C5) The method of reliable store-and-forward data handling of claim C3 wherein said response message includes at least one of the battery life expectancy, the amount of memory available for storing said data packets, and the connectivity to said data collection server of the replying terminal. There has also been described (C6) The method of reliable store-and-forward data handling of claim C3 wherein said criteria for receiving data packets is based on the information contained in said response message. There has also been described (C7) The method of reliable store-and-forward data handling of claim C3 wherein said criteria for receiving data packets includes at least one of the connectivity of the terminal originating said response message to said data collection server; the amount of memory available for storing said data packets at the terminal originating said response message, exceeding a first threshold value; the battery life expectancy of the terminal originating said response message, exceeding a second threshold value. There has also been described (C8) The method of reliable store-and-forward data handling of claim C3 wherein said criteria for receiving data packets includes creating a wireless network snapshot comprising said responses received from said plurality of encoded information reading terminals; followed by sorting said wireless network snapshot in the order of the connectivity of the terminal originating said response message to said data collection server, amount of memory available for storing said data packets at the terminal originating said response message, and the battery life expectancy of the terminal originating said response message; and followed by transmitting said one or more data packets to said one or more peer terminals in the order of said sorted responses. There has also been described (C9) The method of reliable store-and-forward data handling of claim C3 wherein the operator of said terminal is able to select a level of data redundancy in storing and forwarding said captured data within said data collection system; wherein said level of data redundancy is controlled by a first threshold number; and wherein each said data packet from said outbound data queue is forwarded by each terminal of said plurality of encoded information reading terminals to a number of said peer terminals not exceeding said first threshold number. There has also been described (C10) The method of reliable store-and-forward data handling of claim C9 wherein said first threshold number is contained in said header of each said data packet from said outbound data queue. There has also been described (C11) The method of reliable store-and-forward data handling of claim C3 wherein the operator of said terminal is able to select a level of data redundancy in storing and forwarding said captured data within said data collection system; wherein said level of data redundancy is controlled by a second threshold number said second threshold number representing number of wireless network "hops" to be traversed by said data packet; wherein said encoded information reading terminal upon receiving said data packet from one of said peer terminals, decrements by one said number of wireless network "hops" to be traversed by said data packet; and wherein said encoded information reading terminal forwards said data packet to one or more of said peer terminals conditionally, upon satisfying the condition that the value of the number wireless network "hops" after executing said decrementing is more than zero. There has also been described (C12) The method of reliable store-and-forward data handling of claim C11 wherein said second threshold number is contained in said header of each said data packet from said outbound data queue.

D1. An encoded information reading terminal operating in a data collection system including an external data collection server and a plurality of peer terminals, the encoded information reading terminal comprising: an encoded information reading device outputting decoded message data corresponding to an encoded message, the encoded information reading device selected from the group consisting of a bar code reading device, an RFID reading device, and IC card reading device; a hand held housing incorporating said encoded information reading device; at least one wireless communication interface; a memory device; a battery; wherein said encoded information reading terminal further has a user interface enabling the operator of said terminal to select a level of data redundancy in storing and forwarding data within said data collection system. There has also been described (D2) The encoded information reading terminal of claim D1 wherein said user interface includes a data input area enabling said operator to specify a maximum number of wireless network "hops" to be traversed by a data packet containing said decoded message data originated by said terminal. There has also been described (D3) The encoded information reading terminal of claim D2 wherein said user interface includes a data input area enabling said operator to specify a maximum number of peer terminals that said terminal would transmit a data packet to.

While the present invention has been described with reference to a number of specific embodiments, it will be understood that the true spirit and scope of the invention should be determined only with respect to claims that can be supported by the present specification. Further, while in numerous cases herein systems and apparatuses and methods are described as having a certain number of elements, it will be understood that such systems, apparatuses and methods can be practiced with fewer than the mentioned certain number of elements.

The invention claimed is:

1. An encoded information reading terminal operating in a data collection system including an external data collection server and a plurality of peer terminals, the encoded information reading terminal comprising:
    an encoded information reading device outputting decoded message data corresponding to an encoded message, the encoded information reading device selected from the group consisting of a bar code reading device, an RFID reading device, and IC card reading device;
    a hand held housing incorporating said encoded information reading device;
    at least one wireless communication interface;
    a memory device;
    a battery;
    wherein said encoded information reading terminal is configured, upon power up, to initialize in said memory a data structure for storing an outbound data queue for queuing data packets intended for the delivery to said data collection server;
    wherein said encoded information reading terminal is further configured, in response to a user interface action, to perform a data capture operation yielding captured data, followed by formatting said captured data into one or more data packets, each of said data packets comprising a header and a payload, and further followed by appending said one or more data packets to said outbound data queue;
    wherein said encoded information reading terminal is further configured, in response to receiving a wireless message from one or more of said peer terminals, said message containing one or more data packets of said captured data, to append said one or more data packets to said outbound data queue; and
    wherein said encoded information reading terminal is further configured to periodically ascertain the presence of data packets in said outbound data queue and upon detecting the presence of one or more data packets in said outbound data queue to perform a method of forwarding the data packets from said outbound data queue to at least one of said data collection server and one or more of said peer terminals;

wherein said encoded information reading terminal is further configured to forward the packets from said outbound data queue by:
(i) reading a data packet from said outbound data queue;
(ii) conditionally, upon ascertaining that said encoded information reading terminal has direct connectivity to said data collection server, sending said data packet to said data collection server and removing said data packet from said outbound data queue; and
(iii) conditionally, upon ascertaining that said encoded information reading terminal does not have direct connectivity to said data collection server, sending a wireless broadcast message to said peer terminals, followed by sending said data packet to one or more of said peer terminals which has sent a response message to said broadcast message and which satisfy a criteria for receiving data packets;
wherein said encoded information reading terminal is further configured to allow an operator of said terminal to select a level of data redundancy in storing and forwarding said captured data within said data collection system;
wherein said level of data redundancy is controlled by a first threshold number, said first threshold number representing number of wireless network hops to be traversed by said data packet;
wherein said encoded information reading terminal upon receiving said data packet from one of said peer terminals, decrements by one said number of wireless network hops to be traversed by said data packet; and
wherein said encoded information reading terminal only forwards said data packet to one or more of said peer terminals conditionally, upon satisfying the condition that the value of the number wireless network hops after executing said decrementing is more than zero.

2. The encoded information reading terminal of claim 1 wherein said captured data includes at least one of decoded message data outputted by said encoded information reading terminal, image data, and video stream data.

3. The encoded information reading terminal of claim 1 wherein the encoded information reading terminal is configured for a user to select a level of data redundancy in storing and forwarding said captured data within said data collection system.

4. The encoded information reading terminal of claim 1 further configured for an operator of said encoded information reading terminal to select a level of data redundancy in storing and forwarding said captured data within said data collection system; wherein said level of data redundancy is controlled by a second threshold number; and wherein each said data packet from said outbound data queue is forwarded by each terminal of said plurality of encoded information reading terminals to a number of said peer terminals not exceeding said second threshold number.

5. The encoded information reading terminal of claim 1 wherein said response message includes at least one of the battery life expectancy, the amount of memory available for storing said data packets, and the connectivity to said data collection server of the replying peer terminal.

6. The encoded information reading terminal of claim 1 wherein said criteria for receiving data packets is based on the information contained in said response message.

7. The encoded information reading terminal of claim 1 wherein said criteria for receiving data packets includes at least one of the connectivity of the peer terminal originating said response message to said data collection server; the amount of memory available for storing said data packets at the terminal originating said response message, exceeding a first threshold value; the battery life expectancy of the terminal originating said response message, exceeding a second threshold value.

8. The encoded information reading terminal of claim 1 wherein said criteria for receiving data packets includes creating a wireless network snapshot comprising said responses received from said plurality of encoded information reading terminals; followed by sorting said wireless network snapshot in the order of the connectivity of the peer terminal originating said response message to said data collection server, amount of memory available for storing said data packets at the peer terminal originating said response message, and the battery life expectancy of the peer terminal originating said response message; and followed by transmitting said one or more data packets to said one or more peer terminals in the order of said sorted responses.

9. A data collection system comprising:
a plurality of encoded information reading terminals, each having at least an encoded information reading device outputting decoded message data corresponding to an encoded message, the encoded information reading device selected from the group consisting of a bar code reading device, an RFID reading device, and IC card reading device, a hand held housing incorporating said encoded information reading device, at least one wireless communication interface, a memory device, and a battery; and
a data collection server external to said encoded information reading terminal having at least one network interface capable of establishing communications with said plurality of bar code reading terminals, and being in communication with at least a database storing the decoded messages data collected by said terminals;
wherein said data collection system is configured to support ad-hoc network connectivity between said encoded information reading terminals in order to increase the reliability of the delivery of said encoded message data to said data collection server;
wherein each terminal of said plurality of encoded information reading terminals is configured, upon power up, to initialize in said memory a data structure for storing an outbound data queue for queuing data packets intended for delivery to said data collection server;
wherein each terminal of said plurality of encoded information reading terminals is further configured, in response to a user interface action, to perform a data capture and decoding operation yielding captured data, followed by formatting said captured data into one or more data packets, each of said data packets comprising a header and a payload, and further followed by appending said one or more data packets to said outbound data queue;
wherein each terminal of said plurality of encoded information reading terminals is further configured, in response to receiving a wireless message from one or more of said plurality of encoded information reading terminals, said message containing one or more data packets of said captured data, to append said one or more data packets to said outbound data queue; and
wherein each terminal of said plurality of encoded information reading terminals is further configured to periodically ascertain the presence of data packets in said outbound data queue and upon detecting the presence of one or more data packets in said outbound data queue to perform a method of forwarding the data packets from said outbound data queue to at least one of said data collection server and one or more of said peer terminals;

wherein each terminal of said plurality of encoded information reading terminals is further configured to forward the packets from said outbound data queue by:

(i) reading a data packet from said outbound data queue;

(ii) conditionally, upon ascertaining that said encoded information reading terminal has direct connectivity to said data collection server, sending said data packet to said data collection server and removing said data packet from said outbound data queue;

(iii) conditionally, upon ascertaining that said encoded information reading terminal does not have direct connectivity to said data collection server, sending a wireless broadcast message to said peer terminals, followed by sending said data packet to one or more of said peer terminals which has sent a response message to said broadcast message and which satisfy a criteria for receiving data packets;

wherein each terminal of said plurality of encoded information reading terminals is further configured for selecting a level of data redundancy in storing and forwarding said captured data within said data collection system;

wherein said level of data redundancy is controlled by a first threshold number said first threshold number representing number of wireless network "hops" to be traversed by said data packet;

wherein said encoded information reading terminal upon receiving said data packet from one of said peer terminals, decrements by one said number of wireless network "hops" to be traversed by said data packet; and wherein said encoded information reading terminal forwards said data packet to one or more of said peer terminals conditionally, upon satisfying the condition that the value of the number wireless network "hops" after executing said decrementing is more than zero.

10. The data collection system of claim 9 wherein said captured data includes at least one of decoded message data outputted by said encoded information reading terminal, image data, and video stream data.

11. The data collection system of claim 9, wherein each terminal of said plurality of encoded information reading terminals is configured for a user to select a level of data redundancy in storing and forwarding said captured data within said data collection system.

12. The data collection system of claim 9, wherein each terminal of said plurality of encoded information reading terminals is configured for a user to select a level of data redundancy in storing and forwarding said captured data within said data collection system;

wherein said level of data redundancy is controlled by a second threshold number; and wherein each said data packet from said outbound data queue is forwarded by each terminal of said plurality of encoded information reading terminals to a number of said peer terminals not exceeding said second threshold number.

13. The data collection system of claim 9, wherein said response message includes at least one of the battery life expectancy, the amount of memory available for storing said data packets, and the connectivity to said data collection server of the replying peer terminal.

14. The data collection system of claim 9, wherein said criteria for receiving data packets is based on the information contained in said response message.

15. The data collection system of claim 9, wherein said criteria for receiving data packets includes at least one of the connectivity of the peer terminal originating said response message to said data collection server; the amount of memory available for storing said data packets at the peer terminal originating said response message, exceeding a first threshold value; the battery life expectancy of the peer terminal originating said response message, exceeding a second threshold value.

16. The data collection system of claim 9, wherein said criteria for receiving data packets includes creating a wireless network snapshot comprising said responses received from said plurality of encoded information reading terminals; followed by sorting said wireless network snapshot in the order of the connectivity of the peer terminal originating said response message to said data collection server, amount of memory available for storing said data packets at the peer terminal originating said response message, and the battery life expectancy of the peer terminal originating said response message; and followed by transmitting said one or more data packets to said one or more peer terminals in the order of said sorted responses.

17. A method of reliable store-and-forward data handling by an encoded information reading terminal operating in a system including an external data collection server and a plurality of peer terminals, comprising the steps of:

upon power up, initializing in said memory a data structure for storing an outbound data queue for queuing data packets intended for the delivery to said data collection server;

in response to a user interface action, performing a data capture operation yielding captured data, followed by formatting said captured data into one or more data packets, each of said data packets comprising a header and a payload, and further followed by appending said one or more data packets to said outbound data queue;

in response to receiving a wireless message from one or more of said peer terminals, said message containing one or more data packets of said captured data, appending said one or more data packets to said outbound data queue; and periodically ascertaining the presence of data packets in said outbound data queue and upon detecting the presence of one or more data packets in said outbound data queue, forwarding the data packets from said outbound data queue to at least one of said data collection server and one or more of said peer terminals;

wherein said forwarding the packets from said outbound data queue further comprises the steps of:

(i) reading a data packet from said outbound data queue;

(ii) conditionally, upon ascertaining that said encoded information reading terminal has direct connectivity to said data collection server, sending said data packet to said data collection server and removing said data packet from said outbound data queue;

(iii) conditionally, upon ascertaining that said encoded information reading terminal does not have direct connectivity to said data collection server, sending a wireless broadcast message to said peer terminals, followed by sending said data packet to one or more of said peer terminals which has sent a response message to said broadcast message and which satisfy a criteria for receiving data packets;

wherein said criteria for receiving data packets includes creating a wireless network snapshot comprising said responses received from said plurality of encoded information reading terminals; followed by sorting said wireless network snapshot in the order of the connectivity of the peer terminal originating said response message to said data collection server, amount of memory available for storing said data packets at the peer terminal originating said response message, and the battery life expectancy of the peer terminal originating said response message; and followed by transmitting said one or more data packets to said one or more peer terminals in the order of said sorted responses.

18. The method of reliable store-and-forward data handling of claim 17 wherein said captured data includes at least one of decoded message data corresponding to an encoded message, said decoded message data outputted by said encoded information reading terminal, image data, and video stream data.

19. The method of reliable store-and-forward data handling of claim 17, wherein an operator of said encoded information reading terminal is able to select a level of data redundancy in storing and forwarding said captured data within said data collection system.

20. The method of reliable store-and-forward data handling of claim 17, wherein said response message includes at least one of the battery life expectancy, the amount of memory available for storing said data packets, and the connectivity to said data collection server of the replying peer terminal.

21. The method of reliable store-and-forward data handling of claim 17, wherein said criteria for receiving data packets is based on the information contained in said response message.

22. The method of reliable store-and-forward data handling of claim 17, wherein said criteria for receiving data packets includes at least one of the connectivity of the peer terminal originating said response message to said data collection server; the amount of memory available for storing said data packets at the peer terminal originating said response message, exceeding a first threshold value; the battery life expectancy of the peer terminal originating said response message, exceeding a second threshold value.

23. The method of reliable store-and-forward data handling of claim 17, wherein an operator of said encoded information reading terminal is able to select a level of data redundancy in storing and forwarding said captured data within said data collection system;
    wherein said level of data redundancy is controlled by a first threshold number; and
    wherein each said data packet from said outbound data queue is forwarded by each terminal of said plurality of encoded information reading terminals to a number of said peer terminals not exceeding said first threshold number.

24. The method of reliable store-and-forward data handling of claim 23 wherein said first threshold number is contained in said header of each said data packet from said outbound data queue.

25. The method of reliable store-and-forward data handling of claim 17, wherein an operator of said encoded information reading terminal is able to select a level of data redundancy in storing and forwarding said captured data within said data collection system;
    wherein said level of data redundancy is controlled by a second threshold number said second threshold number representing number of wireless network "hops" to be traversed by said data packet;
    wherein said encoded information reading terminal upon receiving said data packet from one of said peer terminals, decrements by one said number of wireless network "hops" to be traversed by said data packet; and
    wherein said encoded information reading terminal forwards said data packet to one or more of said peer terminals conditionally, upon satisfying the condition that the value of the number wireless network "hops" after executing said decrementing is more than zero.

26. The method of reliable store-and-forward data handling of claim 25 wherein said second threshold number is contained in said header of each said data packet from said outbound data queue.

\* \* \* \* \*